US007002918B1

(12) United States Patent
Prieto, Jr. et al.

(10) Patent No.: US 7,002,918 B1
(45) Date of Patent: Feb. 21, 2006

(54) METHOD AND APPARATUS FOR REAL TIME SCHEDULING IN A SATELLITE COMMUNICATIONS NETWORK

(75) Inventors: Jaime L. Prieto, Jr., Torrance, CA (US); Stuart T. Linsky, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/575,552

(22) Filed: May 22, 2000

(51) Int. Cl.
*G01R 31/08* (2006.01)

(52) U.S. Cl. ............... 370/252; 370/337; 370/369; 370/412

(58) Field of Classification Search ............ 370/323, 370/254, 328, 338, 408, 322, 329, 341–348, 370/390–395.53, 468, 400, 337, 399, 418, 370/411, 347, 412, 252, 413, 229, 330, 369, 370/389, 352, 230, 401, 445, 428; 709/226, 709/223–229, 235, 245; 703/27; 711/138; 320/468; 389/353; 412/358, 230–235, 328; 455/12.1, 427, 453; 375/376
See application file for complete search history.

(56) References Cited

U.S. PATENT DOCUMENTS

| | | | |
|---|---|---|---|
| 5,889,779 A | | 3/1999 | Lincoln |
| 5,974,465 A | | 10/1999 | Wong |
| 6,128,295 A | * | 10/2000 | Larsson et al. ............. 370/389 |
| 6,262,986 B1 | * | 7/2001 | Oba et al. .................. 370/399 |
| 6,292,465 B1 | * | 9/2001 | Vaid et al. .................. 370/230 |
| 6,381,228 B1 | * | 4/2002 | Prieto et al. ............... 370/323 |
| 6,556,578 B1 | * | 4/2003 | Silberschatz et al. ....... 370/412 |
| 6,567,416 B1 | * | 5/2003 | Chuah ........................ 370/418 |
| 6,640,248 B1 | * | 10/2003 | Jorgensen .................. 709/226 |
| 6,680,933 B1 | * | 1/2004 | Cheesman et al. .......... 370/352 |
| 6,693,915 B1 | * | 2/2004 | Lappetelainen et al. .... 370/468 |
| 6,697,378 B1 | * | 2/2004 | Patel .......................... 370/468 |
| 6,754,206 B1 | * | 6/2004 | Nattkemper et al. ........ 370/369 |
| 6,754,215 B1 | * | 6/2004 | Arikawa et al. ......... 370/395.4 |
| 6,785,252 B1 | * | 8/2004 | Zimmerman et al. ....... 370/337 |

OTHER PUBLICATIONS

Nicol, D.; Conservative parallel simulation of priority class queuing networks, IEEE Transactions on Parallel and Distributed Systems, vol. 3, Issue 3, 1992, pp. 294-303.*

IEEE Communications Magazine, "Hardware Implementation of Fair Queuing Algorithms for Asynchronous Transfer Mode Networks", Varma and Stiliadis, p. 54 et seq (Dec. 1999).

Proceedings of the IEEE, "Service Disciplines for Guaranteed Performance Service in Packet-Switching Networks", Zang, vol. 83, No. 10, p. 1374 et seq (Oct. 1999).

(Continued)

*Primary Examiner*—Chieh M. Fan
*Assistant Examiner*—Prenell Jones

(57) ABSTRACT

A method and apparatus for scheduling, in real-time, the order in which data packets from multiple uplink channels are organized in a downlink channel of a satellite communications network. The satellite includes a uplink and downlink channels for conveying data packets over channels between user terminals, ground stations and other user terminals. Queues in the satellite collect data packets from uplinks and output the data packets to the downlink using a bandwidth that is dynamically allocated. A scheduler allocates the bandwidth to at least one queue and continuously changes the amount of bandwidth allocated to each active queue while the queue is buffering data packets between the uplinks and downlink. The scheduler allocates bandwidth based upon a priority-class packet service schedule calculated based upon traffic parameters associated with each active queue.

4 Claims, 4 Drawing Sheets

OTHER PUBLICATIONS

Proceedings of the 1997 International Conference on Networking Protocols, "High Speed, Scalable, and Accurate Implementation of Packet Fair Queuing Algorithms in ATM Networks", Bennett, Stephens and Zhang, p. 7-14, (Oct. 1997).

* cited by examiner

METHOD AND APPARATUS FOR REAL TIME SCHEDULING IN A SATELLITE COMMUNICATIONS NETWORK

BACKGROUND OF THE INVENTION

The present invention generally relates to a satellite communications network and more specifically to a satellite communications network for real time down-link scheduling of statistical bandwidth of data streams buffered through an out-bound module of a communications satellite.

Satellite communications systems have been proposed for relaying communications signals between one or more user terminals and a ground station. The user terminals may be located at various places about the world with multiple terminals located in a common field of view of one satellite. The satellites typically include antenna arrays that define spot beams or footprints on the earth's surface. The satellites generally receive communications data streams from multiple terminals located in each spot beam. The data streams are received over separate uplinks or virtual channel connections. The satellite combines the incoming data streams for terminals in common spot beams and passes a combined down-link signal containing multiple data streams to a ground station or another user terminal. The receiving terminal or ground station may be located in a common spot beam as the transmitting terminal or in a different spot beam.

Satellite communications networks are both in existence and under development for supporting communications channels carrying a variety of data types, such as audio data, video data, video conferencing data, broadcast video data, web surfing data and the like. Existing satellite communications networks support several connection-oriented protocols, such as the ATM (asynchronous transfer mode) protocol for conveying the various data types. As a connection oriented protocol, an ATM network operates such that, before a call is permitted to take place through the network, a network provider guarantees that existing calls will not be unduly adversely affected. For instance, the network provider guarantees that existing connections will maintain a certain minimum quality of service. In addition, before establishing a new call within an ATM network, the network provider must insure that the network will afford a desired minimum quality of service for the new call.

The quality of service defines an ATM requirement for a particular connection, such as a data stream packet/loss ratio, a delay or delay variation between data stream packet transmissions and the like. Two exemplary ATM network control techniques are guaranteed minimum quality of service and best efforts minimum quality of service. In an ATM network, the quality of service for new calls and existing calls may be used for several functions, such as to determine call admission control for new calls and scheduling with respect to the time of transmission for packets associated with existing calls.

Call admission control is the process by which an ATM network determines whether or not to accept a new call or user who is requesting some service from the network. The freedom and flexibility afforded within call admission control and scheduling are dependent upon an amount of bandwidth afforded to an ATM network and upon the bandwidth requirements of individual calls requested from the network. Bandwidth in this context refers to a statistical amount of bandwidth required by a particular connection in order to meet a minimum quality of service required by the connection.

Scheduling is the process by which the network determines the order in which data packets or cells are transmitted over a downlink to a ground or earth station. In more detail, data packets or cells are continuously switched within the satellite among uplink channels to associated out-bound modules. An out-bound module is associated with each down-link to a ground station or earth station. An out-bound module represents a point in the satellite at which several traffic streams are combined into a common single stream. For instance, the out-bound module may be a module in the satellite in which multiple uplink traffic streams are combined and passed to a single down-link traffic stream. The uplink traffic streams may be for multiple users located in common or different footprints of the spot beams created by the satellite. A router or switch is provided in the satellite for receiving incoming data packets from the different data streams. The router or switch identifies, for each data packet, a destination down-link beam.

Based on the destination for each data packet, the router or switch directs each data packet to a corresponding out-bound module.

Each out-bound module includes one or more queues or buffers which receive data packets associated with a particular quality of service. The data packets stored in each buffer are output in a FIFO manner (first in, first out) or FIFS manner (first in, first served). The order between buffers is determined by the scheduler.

The capacity of present microprocessor technology has impacted the amount of processing that may be implemented on a satellite in a digital communications network. Conventional ATM network switching elements require complex scheduling algorithms to be processed for quality of service and fairness guarantees. The limits of current processing speeds have rendered it difficult to permit real time processing associated with quality of service and fairness guarantees, given that the typical network should perform scheduling calculations every few seconds for real-time scheduling. Current scheduling systems operate upon a static scheduling table that is defined based on a priori knowledge and historic traffic patterns. However, use of static scheduling tables leads to wasted bandwidth resources, unfair bandwidth allocation and ultimately loss of throughput and revenue.

In the past, schedulers have been proposed that utilize a look-up table that stores a packet service schedule identifying the order in which the buffers or queues output data packets or cells over the downlink. The packet service schedule defines a master frame comprised of data packets arranged in sequential time slots and passed over the downlink. The packet service schedule comprises a series of entries, each of which is associated with a time slot in the master frame. Each time slot in the look-up table stores a queue index identifying a queue to be accessed during the corresponding time slot. Heretofore, schedulers have been preprogrammed with packet service schedules storing static data transmission orders based on models of projected or estimated traffic demands. Conventional look-up tables are periodically reprogrammed. However, when reprogrammed, the models used to define the look-up tables are based on a priori knowledge concerning historic and projected traffic patterns and bandwidth demands.

However, scheduling based on a priori knowledge may be wasteful. First, a user may utilize less bandwidth than estimated. Consequently, a model may assign in the look-up table an excessive number of time slots to a queue having a particular quality of service, even though the channel requiring the particular quality of service does not need the estimated amount of bandwidth. In this manner, bandwidth in the down-link is assigned, but remains idle. Alternatively, a channel may utilize more bandwidth than estimated. Excessive bandwidth usage requires additional resources to be called upon in order to service the particular user (e.g., an additional buffer may be used having a common or better quality of service than the buffer that is overloaded).

A need remains for an improved downlink scheduler. It is an object of the preferred embodiments of the present invention to meet this need.

BRIEF SUMMARY OF THE INVENTION

A preferred embodiment of the present invention utilizes a method for scheduling, in real-time, an order in which data packets from a plurality of uplink channels are organized in a downlink of a satellite communications network. The method includes conveying data packets over a downlink in an order determined by a packet service schedule. The method monitors at least one traffic parameter associated with each uplink channel conveying a data stream. The traffic parameter is representative of an actual bandwidth usage of the corresponding uplink channel. While conveying data packets over the downlink, the method modifies the packet service schedule based on the monitored traffic parameters. The actual bandwidth used by each uplink channel is monitored to retain an accurate record of the demand being placed on each channel. Data packets are temporarily stored in corresponding queues in an outbound module of the satellite. The data packets are directed to a corresponding queue by a switch based on service requirements associated with the channel carrying such data packets.

Phase information may be measured for each channel. The phase information is indicative of an amount of time lapsed since a data packet from a particular channel was last output from a queue to the downlink. The phase information is subsequently used when calculating the updated packet service schedule. New traffic parameters are continuously obtained for each channel by monitoring the data packets as they arrive at the queues associated with each channel. The data packets are switched from each channel to a unique queue or set of queues where the data packets are temporarily stored before being output to the downlink.

Optionally, the packet service schedule may be stored in a look-up table. The processing associated with conveying data packets, monitoring traffic parameters and modifying the packet service schedule based on the traffic parameters may all be carried out onboard the satellite. Alternatively, a portion of the calculations may be carried out at a ground station and the like.

A new packet service schedule is calculated based on the traffic parameters according to one of various well known fair queuing algorithms, such as a Starting Potential Fair Queuing algorithm, a Frame Based Fair Queuing algorithm and the like. A dynamic amount of bandwidth is allocated for each channel in the packet service schedule. The allocated bandwidth for at least one channel is adjusted while the channel is conveying data packets in order to more effectively utilize the available bandwidth. The allocated bandwidth is adjusted by modifying the packet service schedule to increase or decrease the number of time slots assigned to a particular queue.

An alternative preferred embodiment of the present invention includes a communications satellite comprising at least one uplink and a downlink for conveying data packets over channels between terminals and ground stations. A switch directs data packets from each uplink channel to a unique queue. The satellite includes a plurality of queues for collecting data packets from the uplinks and outputting the data packets to the downlink, wherein the amount of bandwidth associated with each queue is dynamically adjusted. A scheduler is provided in the satellite for allocating bandwidth. The scheduler changes the amount of bandwidth allocated to the queues while the queues are buffering data packets between the uplinks and downlink.

A bandwidth measurement module measures a statistical bandwidth actually being used by each queue. The scheduler updates the bandwidth allocated to each queue based on the measured statistical bandwidth. A look-up table may be used to store a packet service schedule defining a master frame allocating bandwidth to each active queue. The master frame comprises a plurality of sequential time slots. The scheduler assigns to each time slot a priority queue index identifying a queue, from which a data packet should be output during the associated time slot in the master frame.

Optionally, the satellite may include a module for measuring the data packet rate for each queue. A processor in the scheduler calculates statistical bandwidth allocation for each queue based on the measured data packet rate. The scheduler further includes memory storing the packet service schedule. The processor calculates a new bandwidth allocation for each queue based on one of several known fair queuing algorithms.

DETAILED DESCRIPTION OF THE INVENTION

Figure 1:
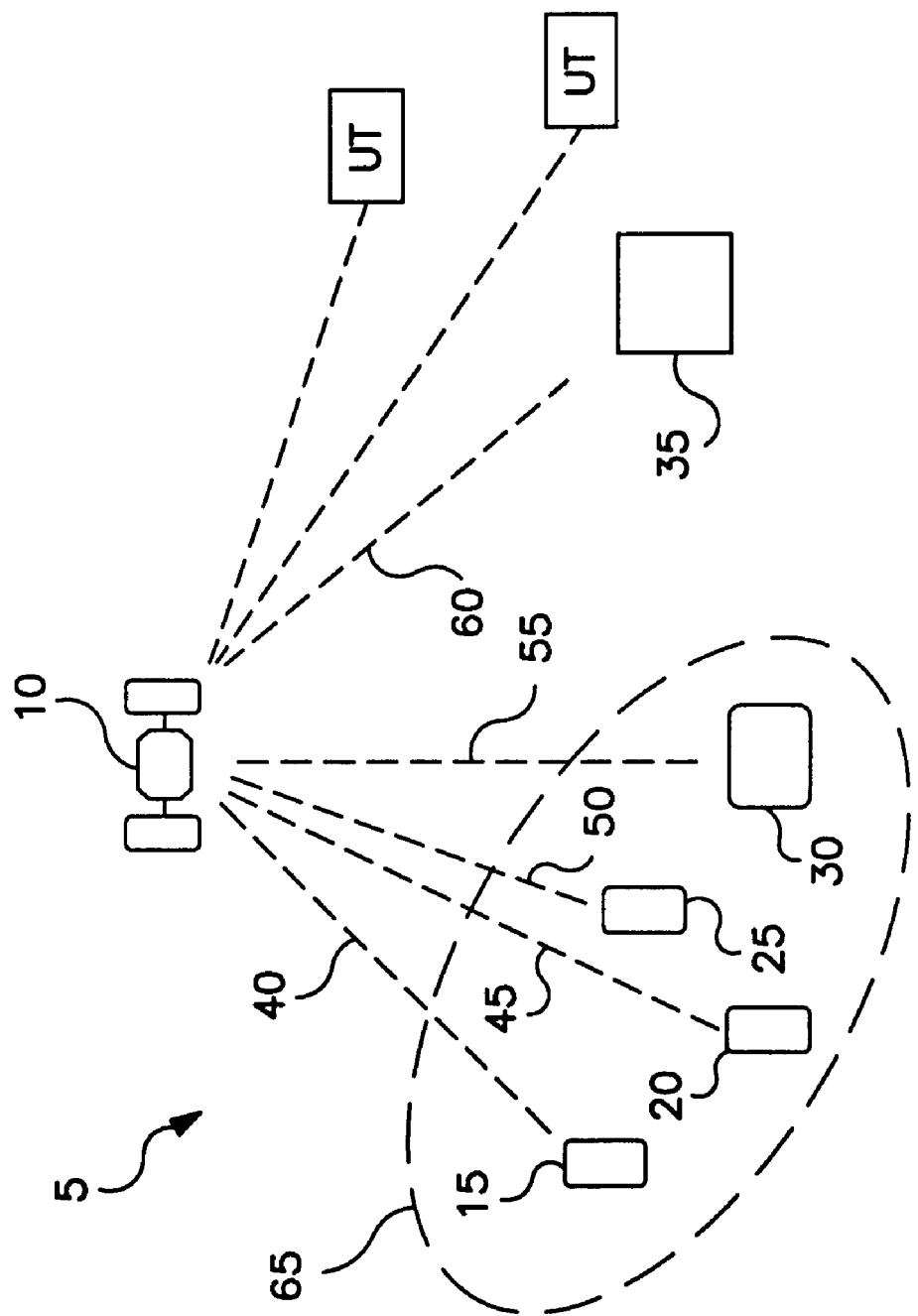
FIG. 1 illustrates a satellite communications system supporting an ATM network in according with a preferred embodiment of the present invention.

FIG. 1 illustrates a satellite communications system 5 that supports an ATM network for carrying communications data, such as voice, audio, video, video conferencing, broadcast video, internet information, data and the like. The satellite communications system 5 includes a satellite 10 that communicates with one or more user terminals 15, 20, 25 and 30 via bi-directional communications links 40–55. The bi-directional communications links 40–55 each include an uplink connection and a downlink connection (not separately shown) for passing communications data to and from the satellite 10. The satellite 10 also communications with an earth station or gateway 35 and other user terminals (some of which are also transmitting on the uplink) via bi-directional communications link 60 which includes an uplink and a downlink for passing communications data to and from the satellite 10. The user terminals 15–30 may be in a common footprint 65 of a single spot beam or many spot beams defined by an antenna of the satellite 10. The ground station 35 or other receiving user terminals may be in the same or a different footprint of a common or different spot beam.

The bi-directional communications links 40–55 may carry one or more data streams to and from the satellite 10. Each data stream supported by the bi-directional communication links 40–55 corresponds to a single call or connection previously or to be established by the ATM network. By way of example only, user terminal 15 may be a hand held mobile cellular phone that establishes a connection with the ATM network by maintaining an uplink connection and a downlink connection over bi-directional communications link 40 with the satellite 10. The uplink connection from the user terminal 15 to the satellite 10 would include data transmitted from the user terminal 15, such as voice data. The satellite 10 collects, via the uplinks within bi-directional communication links 40–55, all data transmitted from user terminals 15–30. Upon receiving the uplink information from bi-directional communication links 40–55, the satellite 10 combines the received data based upon ATM network protocols and transmits the combined data over a downlink in the bi-directional communications link 60 to the ground station 35. The downlink is comprised of a data stream organized into consecutive similarly structured master frames, each of which is divided into time slots. In the reverse direction, the satellite 10 receives uplink data from the ground station 35 and disseminates the uplink data to corresponding user terminals 15–30.

Figures 2, 3:
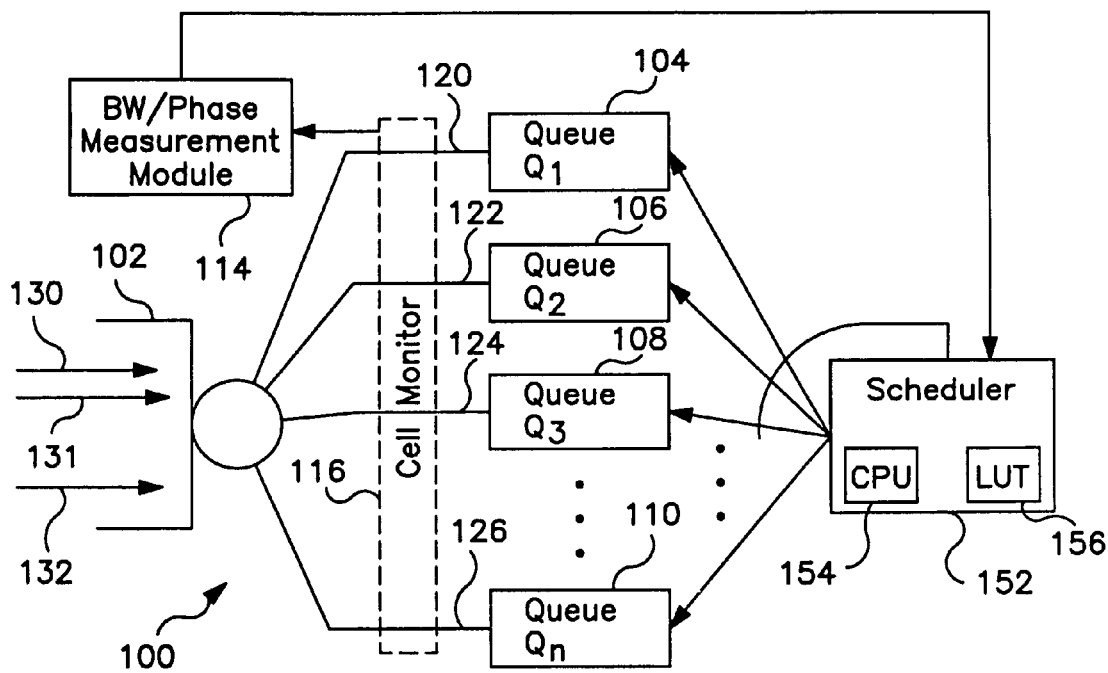
FIG. 2 illustrates an outbound module housed within a communications satellite in accordance with a preferred embodiment of the present invention.
FIG. 3 illustrates a portion of an exemplary packet service schedule utilized in accordance with a preferred embodiment of the preferred embodiment of the present invention.

FIG. 2 illustrates a satellite outbound module 100 according to a preferred embodiment of the present invention. The outbound module 100 represents a point in the satellite 10 where several uplink traffic streams are combined into a single stream to be passed over a downlink. For instance, the outbound module may be a module in the satellite in which multiple uplink traffic streams are combined and passed to a single downlink traffic stream. The uplink traffic streams may be for multiple users located in common or different footprints of the spot beams created by the satellite 10. A router or switch is provided in the satellite for receiving incoming data packets from the traffic streams. The router/switch identifies, for each data packet, a destination downlink beam. Based on the destination for each packet, the router/switch directs each data packet to a corresponding outbound module 100.

The outbound module 100 is housed within the satellite 10 and operates to receive communications data over the uplinks within bi-directional communications links 40–55. The communications data received by the outbound module 100 is segmented into packets, such as in accordance with the ATM protocol. The outbound module 100 conveys the packets of communications data, via queues or buffers, to a common downlink such as in bi-directional communications link 60. The aggregate queued communications data is subsequently passed to ground station 35. The outbound module 100 includes a switch 102 for receiving communications data from a plurality of individual connections or callers. Each connection or caller is associated with a single uplink from the user terminals 15–30 and a single queue for downlinking.

By way of example, FIG. 2 illustrates three incoming communications signals 130–132 which are subsequently redirected by the switch 102 to corresponding buffers 104–110. The buffers 104–110 may vary in number and criteria for receiving communications data packets. In the example of FIG. 2, n buffers are illustrates, each of which has a different priority class or quality of service (QoS) associated therewith. For instance, buffer 104 may receive communications data packets from a data stream that require a particular quality of service designated as QoS1. Similarly, buffers 106 and 108 may receive communications data packets from corresponding data streams associated with second through fifth qualities of services QoS2–QoS5.

The switch 102 directs corresponding packets of communications data from connections 130–132 to a corresponding buffer 104–110 based upon the quality of service required by the connection.

The buffers 104–110 represent FIFO (first in first out) or FCFS (first come first served) queues, whereby an incoming data stream of packets is temporarily stored or queued up in one of buffers 104–110 before being selected for transmission to the downlink within bi-directional communications link 60. A scheduler 152 determines the order in which the buffers 104–110 distribute data packets to the downlink.

The outbound module 100 further includes a bandwidth measurement module 114 which communicates with a packet monitor 116 in order to record and track the data streams passing over lines 120–126 through buffers 104–110. The packet monitor 116 measures at least one traffic parameter associated with each data stream carried over lines 120–126 and queued into the buffers 104–110. By way of example only, the traffic parameters may include one or more of a count of the number of packets received per second by each buffer, a count of the number of bits received per second by each buffer, a count of the total number of packets received by a particular buffer over a period of time and/or a count of the total number of bits received by a particular buffer over a period of time.

The traffic parameters collected by the packet monitor 116 are passed to a bandwidth measurement module 114 which calculates a statistical bandwidth actually being used by the data streams carried over paths 120–126 and through buffers 104–110. The bandwidth measurement module 114 calculates statistical bandwidth for each data stream based upon the traffic parameters collected by the packet monitor 116. The bandwidth measurement module 114 may calculate statistical bandwidths for individual buffers 104–110, for groups of buffers associated with a common priority class, for an entire outbound module 100 and the like. By way of example, the bandwidth measurement module 114 may calculate the aggregate arrival rate per outbound module 100 (e.g., mean, standard deviation and the like). The aggregate arrival rate per outbound module corresponds to the rate (packets or bits per second) at which the data streams are received. In addition, the bandwidth measurement module 114 may calculate the overall inter-arrival time(IAT) per outbound module (e.g., mean, standard deviation and the like). The overall inter-arrival time represents the time between arrival of packets. The bandwidth measurement module 114 may calculate the overall inter-arrival time for the outbound module 100 in order to determine the burstiness of the data streams as a whole received by the outbound module 100.

In addition or alternatively, the bandwidth measurement module 114 may calculate the statistical bandwidth per buffer or priority class. By way of example, the bandwidth measurement module 114 may calculate the arrival rate per buffer 104–110 and/or the inter-arrival time per buffer 104–110. The arrival rate and inter-arrival time per priority class may be characterized in any statistical fashion, such as by the average, mean, median, standard deviation and the like. Similarly, the statistical bandwidth for the outbound module 100 may be characterized by utilizing any statistical measurement, such as the average, mean, median, standard deviation and the like.

Once the traffic parameters are obtained, the statistical calculation may be made for each desired random variable in order to calculate the equivalent bandwidth for one or more data streams. The parameters for real-time statistical bandwidth calculation per priority class and per outbound module are, by way of example only, moving average estimation, standard deviation estimation, and information vector (I=[$\lambda$, $\sigma^2$, $\alpha$]). Variables that may be used to calculate the real-time statistical bandwidth include $\mu$ which represents priority-class buffer index, $\lambda_\mu$ which represents mean average arrival rate (packets/second), $\sigma_\mu^2$ which represents variance of arrival rate (packets/seconds)$^2$), $\alpha_\mu$ which represents instantaneous variance (per unit time) of the inter-arrival time packet arrival process (cells/second), $IAT_\mu$ which represents mean inter-arrival time, and $IAT_\mu^2$ which represents the second moment of the inter-arrival time.

The schedule 152 includes a CPU 154 and a memory 156. The CPU 154 calculates the bandwidth allocation, in real-time, for each of queues 104–110. The CPU 154 may utilize any of several well-known algorithms for calculating bandwidth allocation, such as Starting Potential Fair Queuing, Frame Based Fair Queuing and the like. Exemplary fair queuing algorithms are described in the following articles:

1) IEEE Communications Magazine, "*Hardware Implementation of Fair Queuing Algorithms for Asynchronous Transfer Mode Networks*", Varma and Stiliadis, Pg. 54 et seq (December 1999).
2) Proceedings of the IEEE, "*Service Disciplines for Guaranteed Performance Service in Packet-Switching Networks*", Zang, Vol. 83, No. 10, Pg. 1374 et seq (October 1999).
3) Proceedings of the 1997 International Conference on Networking Protocols, "*High Speed, Scalable, and Accurate Implementation of Packet Fair Queuing Algorithms in ATM Networks*", Bennett, Stephens and Zhang, Pg. 7–14, (October 1997).

The CPU 154 generates a packet service schedule based on the fair queuing algorithm calculations. The packet service schedule is stored in memory 156. Optionally, the packet service schedule may be stored as a look-up table defining a master frame comprised of time slots that set forth an order in which queues 104–110 output data packets.

FIG. 3 illustrates an exemplary packet service schedule 200 comprised of multiple columns including a time index column 202, a relative time column 204 and a priority index column 206. The packet service schedule 200 is divided into rows. Each row corresponds to a time slot 208 in the master frame. In the example of FIG. 3, time index 0 corresponds to relative time 0 and time slot 1. Time slot 1 has been assigned to queue Q1. Similarly, time indices 1, 2 and 3 indicate that queues Q2, Q3 and Qn have been allocated to the second, third and fourth time slots 210, 212 and 214. In the example of FIG. 3, each time slot 208 corresponds to a discreet period of time such as 2.88 microseconds. By way of example only, a master frame may be 30 milliseconds in length. In the example, the master frame would be divided into 10,418 time slots, each of which is 2.88 microseconds in length. Each time slot 208 is assigned to one of queues Q1–Qn. The master frame represents 100% of the statistical bandwidth that is available over a particular downlink. The scheduler controls the percentage of bandwidth to be allocated to each of the queues Q1–Qn. Based on these bandwidth percentage allocations, the scheduler assigns each time slot to a particular queue Q1–Qn. For instance, if queue Q1 is allocated 25% of the total bandwidth, then the CPU 154 will assign 25% of the time slots 208 to queue Q1. Preferably, the time slots assigned to queue Q1 will be evenly distributed throughout the master frame and packet service schedule 200.

During operation, the scheduler 152 continuously obtains traffic parameter information from the bandwidth/phase measurement module 114 and based thereon continuously recalculates the bandwidth allocation for each of queues Q1–Qn. When the traffic parameters indicate that a particular queue is experiencing higher traffic than previously measured, the scheduler 152 may increase the bandwidth allocated to the particular queue while insuring a minimum quality of service required by all connections being passed through the queue and all other connections in the downlink. When increasing the bandwidth allocated to a particular queue in order to maintain that queues quality of service, the schedule 152 may reduce the bandwidth allocated to another queue which is using less bandwidth than was previously required to maintain its quality of service.

Figure 4:
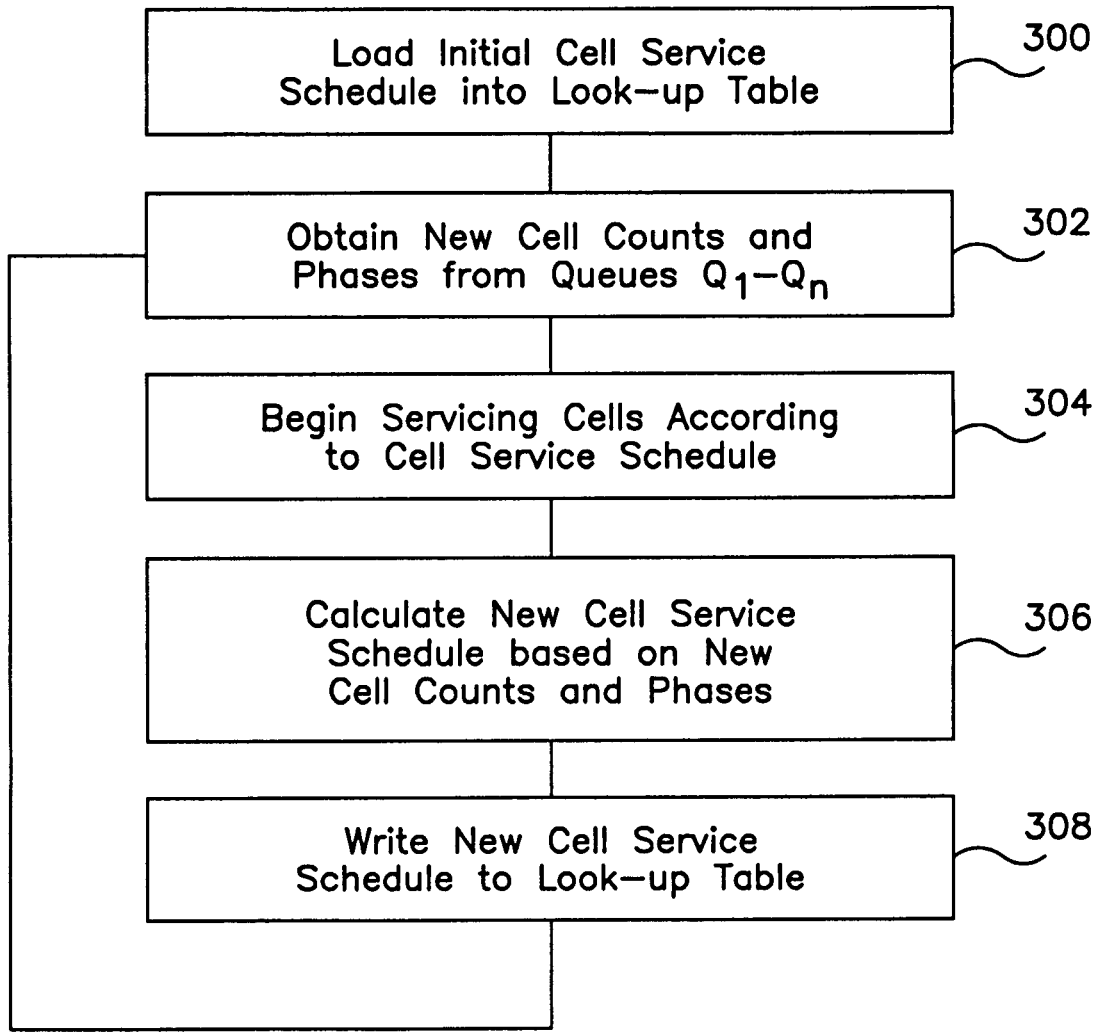
FIG. 4 illustrates a flow chart outlining a processing sequence carried out in accordance with a preferred embodiment of the present invention.

FIG. 4 illustrates an exemplary processing sequence carried out by the scheduler 152 in order to dynamically and in real-time allocate bandwidth to any active channels passing through queues Q1–Qn. Initially, the scheduler 152 loads an initial packet service schedule into the look-up table 156 (step 300). Next, the processor 154 obtains new cell counts and phase information associated with each of queues Q1–Qn from the bandwidth/phase measurement module 114 (step 302). Then the scheduler 152 begins servicing data packets stored in active queues Q1–Qn according to the initial packet service schedule (step 304).

While the scheduler 152 services queues Q1–Qn according to the initial packet service schedule, the CPU 154 calculates a new packet service schedule based on the new cell counts and phase information obtained from module 114 (step 306). Finally, the CPU 154 writes the new packet service schedule to the look-up table 156 (step 308). The process of steps 302–308 is continuously repeated throughout operation of the communications satellite network in order to continuously monitor the actual demand upon data channels passing through queues Q1–Qn. Based on the actual demand, the scheduler 152 is able to update, in real-time, the bandwidth allocation more efficiently and effectively.

Figure 5:
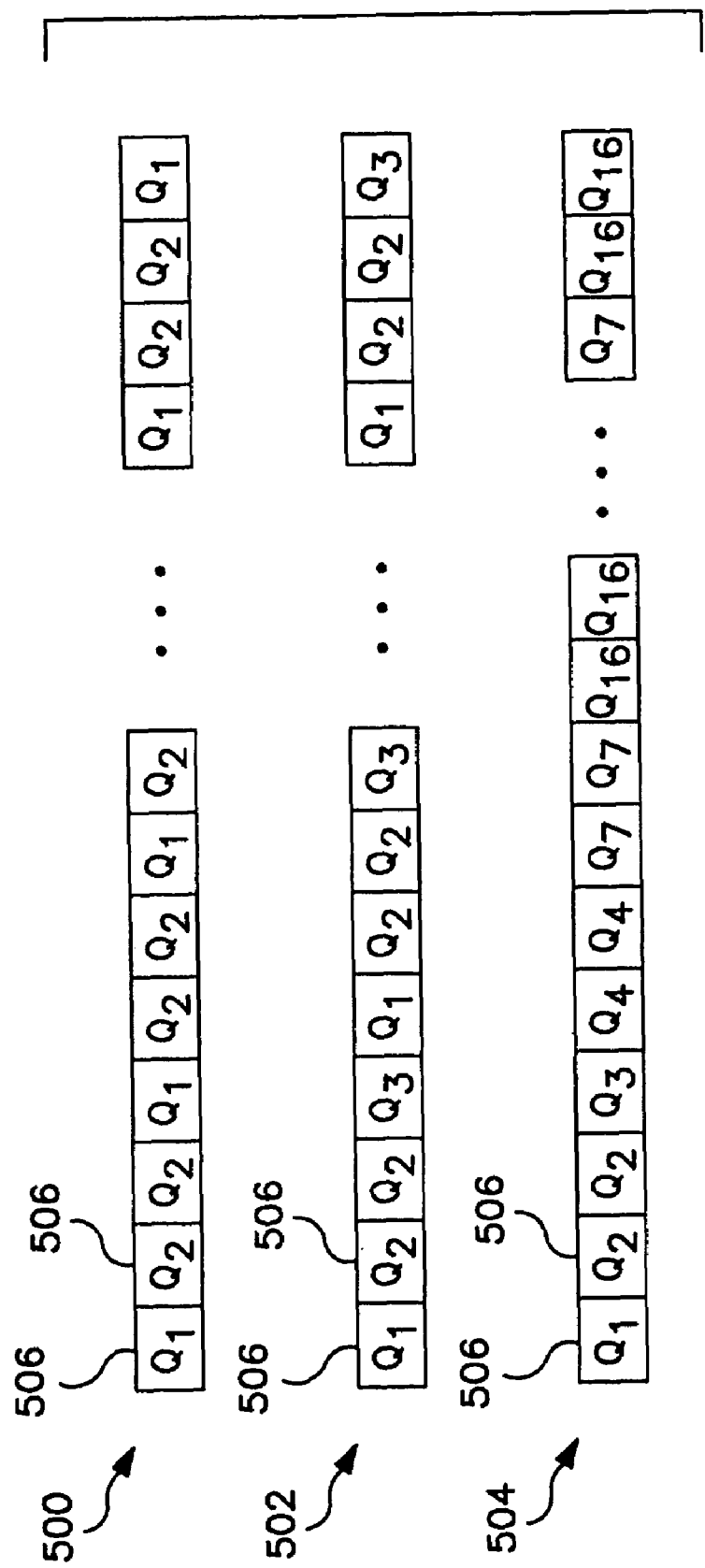
FIG. 5 illustrates a sequence of master frames assigned in accordance with a preferred embodiment of the present invention in real-time based upon traffic parameters measured while the queues are in active use.

FIG. 5 illustrates an exemplary implementation of at least one preferred embodiment of the present invention. FIG. 5 illustrates three master frames 500–504 associated with three separate packet service schedules stored in look-up table 156 at different points in time. Each of master frames 500–504 are generated by the CPU 154 during operation of the outbound module 100 based upon the real-time traffic demands being placed upon queues Q1–Qn. Each master frame 500–502 is comprised of a plurality of time slots 506. Each time slot 506 designates a particular queue Q1–Qn to output a data packet during the corresponding time slot in the downlink. In the example of FIG. 5, master frame 500 may represent an initial demand placed upon the outbound module 100. During the initial demand associated with master frame 500, only queues Q1 and Q2 carry traffic, while the remaining queues Q3–Qn remain idle (inactive).

Returning to FIG. 4, at step 300, the CPU 154 loads the initial packet service schedule associated with master frame 500 into the look-up table 156. The initial packet service schedule may be generated by the CPU 154. Alternatively, the initial packet service schedule may be uploaded from a ground station. During the initial service, while queues Q1 and Q2 are the only active queues, the scheduler 152 may allocate the entire bandwidth available through the outbound module 100 to queues Q1 and Q2. When it is desirable to allocate the entire bandwidth to only the active queues Q1 and Q2, the master frame 500 is loaded such that all of the time slots 506 are assigned to one of queues Q1 and Q2.

In the example of FIG. 5, it is assumed that the minimum quality of service required by Q1 corresponds to at least 10% of the entire bandwidth available to outbound module 100, while the minimum quality of service required by the channel associated with queue Q2 requires at least 20% of the total available bandwidth over outbound module 100. As the remaining queues Q3–Qn are idle, additional bandwidth in excess of the minimum requirements has been afforded to queues Q1 and Q2 in the master frame 500. The total bandwidth assigned to queues Q1 and Q2 may be proportional to the relation of the minimum qualities of service for each queue. Consequently, as queue Q2 requires a quality of service having approximately double the bandwidth as compared to the quality of service associated with queue Q1, twice as many time slots 506 in master frame 500 may be assigned to queue Q2. In the example of FIG. 5, the time slots are assigned such that two time slots are assigned to queue Q2 for every time slot assigned to queue Q1.

After the initial packet service schedule corresponding to master frame 500 is loaded in step 300 and used by the scheduler 152, processing passes to step 302 (FIG. 4) at which the scheduler 152 obtains new cell counts and phases from the queues Q1–Qn. Control passes to step 304 where the scheduler 152 begins servicing cells Q1 and Q2 according to the packet service schedule designated in master frame 500.

Next, the scheduler 152 calculates a new packet service schedule based on the new cell counts and phases obtained in step 302. At step 306, in the example of FIG. 5, it is assumed that queue Q3 becomes active and thus requires some portion of bandwidth allocation. In the example of FIG. 5, the bandwidth/phase measurement module 114 measures the traffic parameters associated with queue Q3 and passes these traffic parameters to the scheduler 152. The processor 154 calculates from the traffic parameters for queue Q3 that the minimum quality of service required by the actual demand being placed on queue Q3 requires approximately 10% of the total bandwidth available in the outbound module 100. Consequently, the processor 154 reallocates the time slots 506 in the master frame 502 to afford at least a minimum bandwidth to queue Q3.

Optionally, the processor 154 may assign the minimum number of time slots 506 to queue Q3 in order to afford 10% of the total available bandwidth to queue Q3. Alternatively, the queue Q3 may be afforded more bandwidth than its minimum requirement. In the example of FIG. 5, the processor 154 has determined from the traffic parameters for queues Q1–Q3 that the minimum bandwidth requirements for each queue are 10%, 20% and 10%, respectively, of the total available bandwidth. The processor 154 divides the total bandwidth of the outbound module proportionally between queues Q1–Q3. In other words, the processor 154 assigns 25% of the total bandwidth to queue Q1, 50% of the total bandwidth to queue Q2, and 25% of the bandwidth to queue Q3. These assignments are illustrated in master frame 502 by consecutively assigning time slots 506 in the following manner: Q1, Q2, Q2, Q3.

Returning to FIG. 4, the scheduler 152 writes the new packet service schedule associated with the master frame 502 to the look-up table 156 and the scheduler 152 begins controlling queues Q1–Q3 accordingly. Processing returns to step 302 at which the scheduler 152 obtained new traffic parameters for queues Q1–Qn. In the example of FIG. 5, it is assumed that queues Q4, Q7 and Q16 become active and the associated traffic parameters indicate that the present bandwidth demands of queues Q4, Q7 and Q16, each require approximately 20% of the total available bandwidth from the outbound module 100.

At step 304, the scheduler 152 begins servicing the cells in queues Q1–Q3 according to the master frame 502 stored as the packet service schedule. At step 306, the processor 154 generates master frame 504 based on the new traffic parameters indicating that queues Q1, Q2, Q3, Q4, Q7, Q16 require 10%, 20%, 10%, 20%, 20%, 20%, respectively, of the total bandwidth available in outbound port 100. The processor 154 assigns the time slots 506 in master frame 504 as indicated in FIG. 5 as follows: Q1, Q2, Q2, Q3, Q4, Q4, Q7, Q7, Q16 and Q16. The foregoing sequence of queue assignments is continuously repeated throughout the length of the master frame 504. The master frame 504 is written to the look-up table 156 in step 308 and the above process is repeated. In the foregoing manner, the scheduler 154 is able to maximize the use of the bandwidth available in outbound module 100.

A fair queuing scheduling algorithm may be implemented using ground based processing depending upon the complexity of the algorithm desired to be used. It is preferable that ground base processing be minimized or eliminated as ground base processing requires uplink and downlink data resources to convey scheduling information to and from the satellite. Ground based processing table entries may arrive delayed at the communications satellite by several hundreds of milliseconds due to propagation delay and input/output bottlenecks. Accordingly, it is preferable that scheduling operations be carried out on-board the satellite.

Various scheduling algorithms differ in complexity, in processing resource demands and in processing time. An optimal fair queuing technique may require more processing resources (e.g., memory, speed, time) than are available on certain communications satellites. Accordingly, it may be preferable to load into an on-board scheduler multiple fair queuing algorithms, including at least one optimal algorithm and at least one sub-optimal algorithm. Additional fair queuing algorithms may be loaded on the satellite offering a range of accuracy and precision. A sub-optimal algorithm may approximate certain fair queuing characteristics. The satellite may then be afforded the option of automatically (or based on ground control) picking a fair queuing algorithm from multiple algorithms that best satisfies the implementation criteria of a particular application.

Optionally, the frequency with which the traffic parameters for queues Q1–Qn are monitored may be varied (automatically or by ground control). The traffic parameter monitoring rate may be minimized, so long as sufficient information is made available to the CPU 154 to create a packet service schedule 200 containing time slot entries which substantially approximate a fair queuing algorithm. To further improve the processing speed, the scheduler 152 may be limited to one time stamp per queue (retained over time), one buffer occupancy statistic per queue, one fixed average service rate per queue and the like.

When the I/O transmission rate to and from the scheduler 152 is unduly limited, the rate at which table entries may be programmed in the packet service schedule 200 may become slower than the downlink transmission rate. A ratio may be defined between the downlink transmission rate and the average rate at which time slots are updated in the look-up table. This ratio may be defined as the downlink scheduling percentage. When the downlink scheduling percentage is unduly small, table entries become imprecise. The scheduler 152 becomes unable to update the table fast enough to retain precision, and thus must rely on approximate service needs. A packet service schedule that has not been entirely updated, before all of the time slots are cycled through will be looped through and some queues will be given unnecessary bandwidth as time slots associated with the queues will not yet have been updated to reflect the current traffic parameter measurements.

In addition, when the downlink scheduling percentage becomes unduly small, the time stamps become unaccurate for queues. When the time stamps become inaccurate, the scheduler 152 is afforded with limited knowledge of the output module 100 state and may be unable to maintain queue specific state information on a call-by-call basis. Consequently, when the downlink scheduling percentage becomes unduly small, it is preferable that the scheduler 152 approximate time stamps based upon the assumption that the majority of the queues are busy. In this instance, fair queuing guarantees cannot be insured.

However, during approximate fair queuing, accuracy is more important than precision. Buffer occupancy statistics (traffic parameters) fed to the scheduler 152 enables estimates to be made of total queue occupancy. Consequently, during approximate fair queuing, static priority may be used by the scheduler 152 in addition to the call service schedule 200 to service the queues 104–110 when idle queues are indexed by the packet service scheduler 200. In this instance, maps read from the NOC are no longer needed.

For true fair queuing, when processing capabilities exceed or meet traffic demands, true (non-pseudo) fair queuing may be achieved with only a slight increase in delay bounds. In this scheme, fair queuing calculated statistics (time stamps) match fairly closely with ongoing transmission and arrival events. Undue late arrival of traffic parameters to the scheduler 152 create the potential that table entries created from specific time slots 208 may not lead to service for the intended data packet. However, although some queues 104–110 may perform bandwidth grabbing, the worse case delay imposed on any one queue 104–110 as a consequence is accounted for in the delay bound increase. Consequently, approximate onboard fair queuing is preferable to ground processed table updates.

If the average table write rate is larger than the downlink transmission rate, it is preferable for true fair queuing that only so many entries as can be serviced are written. This circumstance occurs when the downlink scheduling percentage is less than one. The reason for this requirement is to avoid confusion. The scheduler 152 checks off service given to all entries it programs. If entries are not reached, their queues may lose service. It is also important for true fair queuing that downlink scheduling percentages be greater than CAC average downlink utilization. The scheduler may only guarantee fairness over the portion of the downlink that it controls.

For true fair queuing, precision is more important than accuracy in queue occupancy counters. Queue occupancy counters sent to the controller may have conceivably fewer bits than the full 16 bits available. In this case, true fair queuing requires one-to-one correspondence between counters and queue occupancies for low values. Buffer occupancies larger than the maximum expressably for the given number of bits are rounded down to the maximum.

While particular elements, embodiments and applications of the present invention have been shown and described, it will be understood, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

What is claimed is:

1. A method for scheduling, in real-time, an order in which data packets from a plurality of uplink channels stored in priority-class queues are organized in a downlink channel of a satellite communications network, the method comprising:

conveying data packets over a downlink channel in an order determined by a packet service schedule;

monitoring at least one traffic parameter associated with at least one data stream stored in a priority-class queue, the traffic parameter being representative of an actual bandwidth usage of the corresponding priority-class queue;

while conveying data packets over the downlink channel, modifying the packet service schedule based on said at least one traffic parameter; and measuring a phase of each said at least one data stream stored in the priority-class queues phase being indicative of an amount of time lapsed since a data packet from a particular priority-class queue was output to the downlink channel.

2. A method for scheduling, in real-time, an order in which data packets from a plurality of uplink channels stored in priority-class queues are organized in a downlink channel of a satellite communications network, the method comprising:

conveying data packets over a downlink channel in an order determined by a packet service schedule;

monitoring at least one traffic parameter associated with at least one data stream stored in a priority-class queue, the traffic parameter being representative of an actual bandwidth usage of the corresponding priority-class queue;

while conveying data packets over the downlink channel modifying the packet service schedule based on said at least one traffic parameter; and adjusting the bandwidth allocated to at least one priority-class queue, while the priority-class queues are storing data packets.

3. A method for scheduling, in real-time an order in which data packets from a plurality of uplink channels stored in priority-class queues are organized in a downlink channel of a satellite communications network, the method comprising:

conveying data packets over a downlink channel in an order determined by a packet service schedule;

monitoring at least one traffic parameter associated with at least one data stream stored in a priority-class queue, the traffic parameter being representative of an actual bandwidth usage of the corresponding priority-class queue;

while conveying data packets over the downlink channel modifying the packet service schedule based on said at least one traffic parameter; and modifying the packet service schedule by adjusting an amount of bandwidth allocated to at least one priority-class queue while the priority-class queues are storing data packets.

4. A communications satellite comprising:

at least one uplink and downlink for conveying data packets over communications channels;

queues for collecting data packets from uplinks and outputting the data packets to a downlink using a dynamic amount of bandwidth;

a scheduler for allocating bandwidth to at least one queue, said scheduler changing an amount of bandwidth allocated to at least one queue while said at least one queue buffering data packets between an uplink and down link; and a look-up table storing a master frame allocating bandwidth to at least one queue, said master frame comprising a plurality of time slots, each time slot including a priority queue index identifying a queue to output a data packet during the associated a time slot.

* * * * *